United States Patent [19]

Inagami et al.

[11] Patent Number: 4,881,168
[45] Date of Patent: Nov. 14, 1989

[54] VECTOR PROCESSOR WITH VECTOR DATA COMPRESSION/EXPANSION CAPABILITY

[75] Inventors: Yasuhiro Inagami, Kodaira; Takayuki Nakagawa, Kokubunji; Yoshiko Tamaki, Kawagoe; Shigeo Nagashima, Hachioji, all of Japan

[73] Assignee: Hitachi, Ltd., Tokyo, Japan

[21] Appl. No.: 34,950

[22] Filed: Apr. 6, 1987

[30] Foreign Application Priority Data

Apr. 4, 1986 [JP] Japan .................................. 61-76528

[51] Int. Cl.$^4$ ..................... G06F 12/00; G06F 15/347
[52] U.S. Cl. .................................. 364/200; 364/231.8; 364/232.21; 364/252.5; 364/254.2; 364/736
[58] Field of Search ................ 364/730, 736, 200, 900

[56] References Cited

U.S. PATENT DOCUMENTS

| | | | | |
|---|---|---|---|---|
| 4,490,786 | 12/1984 | Nakatani | ........................... | 364/200 |
| 4,621,324 | 11/1986 | Ushiro et al. | ....................... | 364/200 |
| 4,665,479 | 5/1987 | Oinaga | ................................ | 364/200 |

*Primary Examiner*—Eddie P. Chan
*Assistant Examiner*—Christina M. Eakman
*Attorney, Agent, or Firm*—Antonelli, Terry & Wands

[57] ABSTRACT

A vector processor has a memory for storing vector data, a plurality of vector registers each capable of reading or writing plural (m) vector elements in parallel, at least one mask vector register capable of storing m mask bits in parallel, and a transfer section connected to the memory, the plurality of vector registers and the mask vector register and responsive to a store compression instruction or a load expansion instruction for transferring vector elements to or from regularly spaced address locations within the memory from or to selected storage locations of a selected vector register corresponding to valid mask bits. The transfer section includes at least one count unit connected to the mask vector register for counting a total number of valid mask bits within all of the already read out mask bits, and plural (m) access units operable concurrently and connected to the count unit and the mask vector register. Each access unit is responsive to the validity of a corresponding one within currently read out m mask bits, to a total number of valid mask bits or invalid mask bits included within the currently read m mask bits and having preceding sequential numbers of elements to that of the corresponding mask bit, and to the counted total number, and operates to generate an address of a location within the memory which holds a vector element to be transferred to a storage location corresponding to the corresponding mask bit within the selected vector register or which should receive a vector element read out from the storage location.

6 Claims, 10 Drawing Sheets

```
DO 10  I = 1, 100
   IF ( B(I).GT.O ) A(I) = SIN( B(I) )
10 CONTINUE
```

| PARALLEL-BY-ELEMENT PROCESSING CYCLE | LOAD/STORE SUB-PIPE 2-0 | | | LOAD/STORE SUB-PIPE 2-1 | | | LOAD/STORE SUB-PIPE 2-2 | | | LOAD/STORE SUB-PIPE 2-3 | | |
|---|---|---|---|---|---|---|---|---|---|---|---|---|
| | REGISTER 301 | ADDRESS LINE 220 | 230 | REGISTER 301 | ADDRESS LINE 221 | 231 | REGISTER 301 | ADDRESS LINE 222 | 232 | REGISTER 301 | ADDRESS LINE 223 | 233 |
| 1ST | 0 | 0 | ○ | 1 | 1 | ○ | 2 | 2 | ○ | 3 | 3 | ○ |
| 2ND MCNT=4 | 4 PMCNT=0 | 4 | ○ | 5 PMCNT=0 | 5 | × | 6 PMCNT=1 | 5 | ○ | 7 PMCNT=1 | 6 | ○ |
| 3RD MCNT=3 | 7 PMCNT=0 | 7 | × | 8 PMCNT=1 | 7 | × | 9 PMCNT=2 | 7 | ○ | 10 PMCNT=2 | 8 | × |
| 4TH MCNT=1 | 8 PMCNT=0 | 8 | × | 9 PMCNT=1 | 8 | ○ | 10 PMCNT=1 | 9 | × | 11 PMCNT=2 | 9 | ○ |

FIG. 8

| PARALLEL-BY-ELEMENT PROCESSING CYCLE | LOAD/STORE SUB-PIPE 2-0 | | | LOAD/STORE SUB-PIPE 2-1 | | | LOAD/STORE SUB-PIPE 2-2 | | | LOAD/STORE SUB-PIPE 2-3 | | |
|---|---|---|---|---|---|---|---|---|---|---|---|---|
| | REGISTER 301 | ADDRESS LINE 220 | 230 | REGISTER 301 | ADDRESS LINE 221 | 231 | REGISTER 301 | ADDRESS LINE 222 | 232 | REGISTER 301 | ADDRESS LINE 223 | 233 |
| 1ST | 0 | 0 | ○ | 1 | 1 | ○ | 2 | 2 | ○ | 3 | 3 | ○ |
| 2ND MCNT=4 | 4 PMCNT=0 | 4 | ○ | 5 PMCNT=0 | 5 | ○ | 6 PMCNT=0 | 6 | ○ | 7 PMCNT=0 | 7 | ○ |
| 3RD MCNT=4 | 8 PMCNT=0 | 8 | ○ | 9 PMCNT=0 | 9 | ○ | 10 PMCNT=0 | 10 | ○ | 11 PMCNT=0 | 11 | ○ |
| 4TH MCNT=4 | 12 PMCNT=0 | 12 | ○ | 13 PMCNT=0 | 13 | ○ | 14 PMCNT=0 | 14 | ○ | 15 PMCNT=0 | 15 | ○ |

| PARALLEL-BY-ELEMENT PROCESSING CYCLE | LOAD/STORE SUB-PIPE 2-0 | | | LOAD/STORE SUB-PIPE 2-1 | | | LOAD/STORE SUB-PIPE 2-2 | | | LOAD/STORE SUB-PIPE 2-3 | | |
|---|---|---|---|---|---|---|---|---|---|---|---|---|
| | REGISTER 301 | ADDRESS LINE 220 | 230 | REGISTER 301 | ADDRESS LINE 221 | 231 | REGISTER 301 | ADDRESS LINE 222 | 232 | REGISTER 301 | ADDRESS LINE 223 | 233 |
| 1ST | 0 | 0 | ○ | 0 | — | ○ | 0 | 2 | ○ | 0 | 3 | ○ |
| 2ND MCNT=4 | 4 PMCNT=0 | 4 | ○ | 4 PMCNT=1 | 5 | × | 4 PMCNT=1 | 5 | ○ | 4 PMCNT=2 | 6 | ○ |
| 3RD MCNT=3 | 7 PMCNT=0 | 7 | × | 7 PMCNT=0 | 7 | × | 7 PMCNT=0 | 7 | ○ | 7 PMCNT=1 | 8 | × |
| 4TH MCNT=1 | 8 PMCNT=0 | 8 | × | 8 PMCNT=0 | 8 | ○ | 8 PMCNT=1 | 9 | × | 8 PMCNT=1 | 9 | ○ |

FIG. 11

| PARALLEL-BY-ELEMENT PROCESSING CYCLE | LOAD / STORE SUB-PIPE 2-0 | | | LOAD / STORE SUB-PIPE 2-1 | | | LOAD / STORE SUB-PIPE 2-2 | | | LOAD / STORE SUB-PIPE 2-3 | | |
|---|---|---|---|---|---|---|---|---|---|---|---|---|
| | REGISTER 301 | ADDRESS LINE 220 | 230 | REGISTER 301 | ADDRESS LINE 221 | 231 | REGISTER 301 | ADDRESS LINE 222 | 232 | REGISTER 301 | ADDRESS LINE 223 | 233 |
| 1ST | 0 | 0 | ○ | 0 | 1 | ○ | 0 | 2 | ○ | 0 | 3 | ○ |
| 2ND MCNT=4 | 4 PMCNT=0 | 4 | ○ | 4 PMCNT=1 | 5 | ○ | 4 PMCNT=2 | 6 | ○ | 4 PMCNT=3 | 7 | ○ |
| 3RD MCNT=4 | 8 PMCNT=0 | 8 | ○ | 8 PMCNT=1 | 9 | ○ | 8 PMCNT=2 | 10 | ○ | 8 PMCNT=3 | 11 | ○ |
| 4TH MCNT=4 | 12 PMCNT=0 | 12 | ○ | 12 PMCNT=1 | 13 | ○ | 12 PMCNT=2 | 14 | ○ | 12 PMCNT=3 | 15 | ○ |

VECTOR PROCESSOR WITH VECTOR DATA COMPRESSION/EXPANSION CAPABILITY

BACKGROUND OF THE INVENTION

The present invention relates to a vector processor having an instruction for collectively processing vector data consisting of a plurality of data, and more particularly to an efficient system for transfer of vector data with data compression/expansion between a main storage and a processor.

A vector processor having a vector instruction which allows collective processing of a series of vector data has been developed and used primarily for high speed processing of technical and scientific calculations. In the vector processor, the vector instruction is normally processed in a pipeline fashion.

Figure 2:
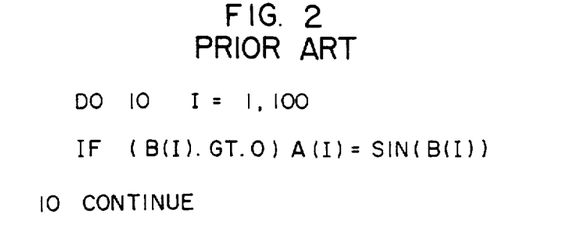
FIG. 2 shows an example of a conventional FORTRAN program.
Figure 3A:
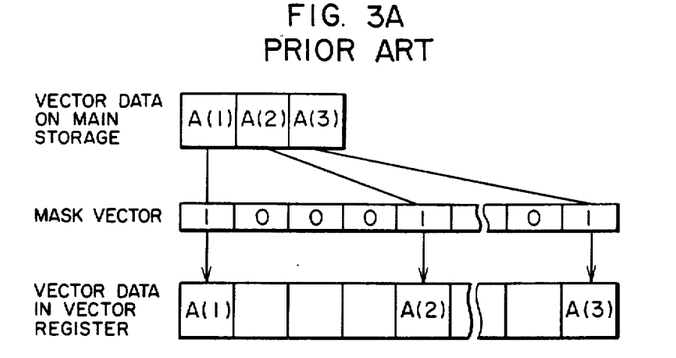
FIG. 3A shows processing of a load expansion instruction in a conventional vector processor.
Figure 3B:
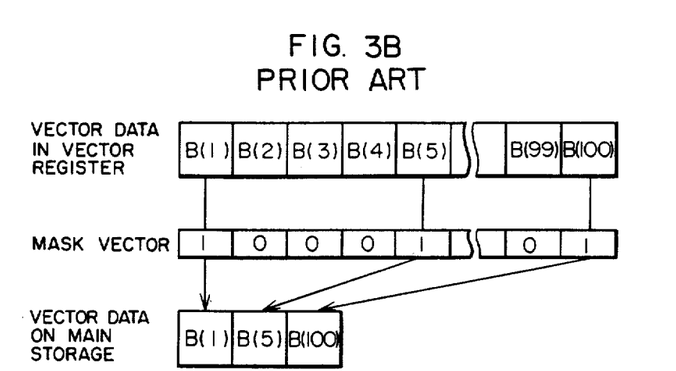
FIG. 3B shows processing of a store compression instruction in a conventional vector processor.

A vector processor which vector-processes a condition clause (vector-processes a DO loop containing an IF clause in a FORTRAN program) has been recently developed. The condition clause processing system in the vector processor is disclosed in "An Efficient Vectorizing Method of Condition Clause in A Vector Processor" Paper 6F-6 of 25th National Conference of Information Processing Society of Japan. In order to efficiently vector-process the condition clause, it is important to avoid any unnecessary operation which does not meet a condition and unnecessary processing of data which does not meet a condition and need not be stored into a main storage. For example, when a FORTRAN program shown in FIG. 2 is to be vector-processed, only when an I-th element B(I) in an array B is larger than 0, will a a trigonometrical function, i.e., the sine value of the I-th element B(I) of the array B, need to be calculated and a result need to be stored into an I-th element A(I) of an array A. The calculation of the trigonometrical function, i.e. the sine function, is carried out by a previously prepared sub-routine, but the transfer of an argument to the sub-routine (array B in FIG. 2) is usually performed through the main storage. Accordingly, in order to efficiently process the program of FIG. 2, it is desirable to store in the main storage only those values of B(I) which meet the condition of B(I)>0 of the IF clause, transfer them to a subroutine for calculating sine functions, and store the calculated results in A(I). In order to vector-process the series of processes at a high speed, the vector processor HITAC S-810 developed by the assignee of the present application provides the following vector instructions.

(1) Load expansion instruction

When vector data in the main storage is to be loaded into a vector register specified by the instruction, the vector elements are loaded only into those storage locations corresponding to "1" bits (mask bits) in a mask vector of a vector mask register. The vector elements at the storage locations whose corresponding mask bits are "0" are not changed.

(2) Store compression instruction

Only the elements at the storage/locations corresponding to "1" mask bits of the vector mask register, of the vector elements in the vector register specified by the instruction, are stored into the main storage.

The load expansion instruction and store compression instruction in the prior art vector processor are shown in JP-A-58-214963. Unique processing in the load expansion instruction and store compression instruction, compared with a simple load vector instruction and store vector instruction, are described below.

In the simple load vector instruction and store vector instruction, a data address on the main storage is updated for each processing of an element, while in the load expansion instruction and store compression instruction, it is updated only when an element whose corresponding mask bit is "1" is processed.

In the vector processor, the vector instruction is processed in a pipeline fashion at a high speed. In order to further improve the processing speed, parallel-by-element processing is used. In the parallel-by-element processing, operation units (operation pipes) which process the vector instructions in a pipelined fashion and circuits (load/store pipes) which load or store vector data in a pipelined fashion are multiplied so that a plurality of vector elements are parallelly processed in a pipeline fashion in one machine cycle. A parallel-by-element processing type vector processor is known by NEC vector processor SX and disclosed in NEC Research and Deveopment, No. 73, pages 1-6, April 1984.

The parallel-by-element processing utilizes the fact that there is no interaction between vector elements in the processing by the vector instruction, and simply multiplexes the pipeline circuits of the same construction to speed up the processing.

However, when the load expansion instruction or store compression instruction is to be processed by the load/store pipes of the prior art parallel-by-element processing type, the following problem is encountered. In the parallel-by-element processing type load/store pipes, address calculation circuits of the multiple circuits (load/store sub-pipes) operate independently from each other. When a conventional load vector instruction or store vector instruction is processed, the address increments of the respective load/store sub-pipes are the same. For example, when four elements are parallelly processed, the addresses of the respective load/store sub-pipes are incremented by four for each processing of one element. Accordingly, there is no problem even if the sub-pipes are independent. However, when the load expansion instruction or store compression instruction is to be processed by the load/store sub-pipes of the parallel-by-element processing type, it cannot be processed in the prior art system for the following reasons. The address updating during the processing of the load expansion instruction or store compression instruction is done only when the load/store element whose corresponding mask bit is "1" is processed. Between load/store sub-pipes, the increments of the address calculation circuits are not equal. The increment of the address cannot be determined solely by the load/store sub-pipe but the address increment must be altered depending on the number of those elements to be processed in other load/store pipes whose corresponding mask bits are "1". Such processing cannot be attained in the prior art parallel-by-element type pipes in which sub-pipes are basically independent.

SUMMARY OF THE INVENTION

It is an object of the present invention to provide a vector processor of a parallel-by-element type pipeline structure which has load-store pipes to parallelly process a load expansion instruction and a store compression instruction at a high speed.

In order to achieve the above object, the vector processor of the present invention comprises:

(a) a memory for storing vector data;

(b) a plurality of vector registers each having a plurality of serially accessable storage location groups each having a predetermined number (m) of storage locations, the m storage locations in each group being accessable to allow parallel reading or writing of vector elements;

(c) at least one vector mask register capable of parallelly reading m mask bits corresponding to the storage locations of each of the storage location groups of said vector registers; and (d) transfer means for parallelly reading from said memory a plurality of vector elements to be written into each of the storage location groups in one of said vector registers or parallelly writing into said memory the plurality of vector elements read from the storage locations of each group in said one vector register, including, (d1) means for detecting a total number of valid mask bits of m mask bits supplied from said mask vector register for an l-th storage location group of said one vector register to be next read or written, (d2) first to m-th registers each holding, as an initial value, an address of the storage location in said memory for a predetermined vector element of the vector data to be read from said memory or the vector data to be written into said memory, (d3) first to m-th signal means, said first signal means producing a predetermined number of bits, and i-th signal means of said second to m-th signal means counting and producing the number of valid mask bits or invalid mask bits contained in the first to (i-1)th mask bit groups of the m supplied mask bits, (d4) first to m-th address means, i-th address means thereof issuing a read request or write request to said memory if the i-th mask bit in the m supplied mask bits is valid, and generating and sending to said memory an address of a vector element to be written into an i-th storage location in the l-th storage location group or an address to which the vector element read from the i-th storage location is to be written based on the address in said first register and the output of said i-th signal means, and (d5) first to m-th address update means for incrementing the addresses in said first to m-th registers by products of the numbers of bits produced by said first to m-th signal means multipled by the address increment of the vector data.

DESCRIPTION OF THE PREFERRED EMBODIMENTS

Figure 1:
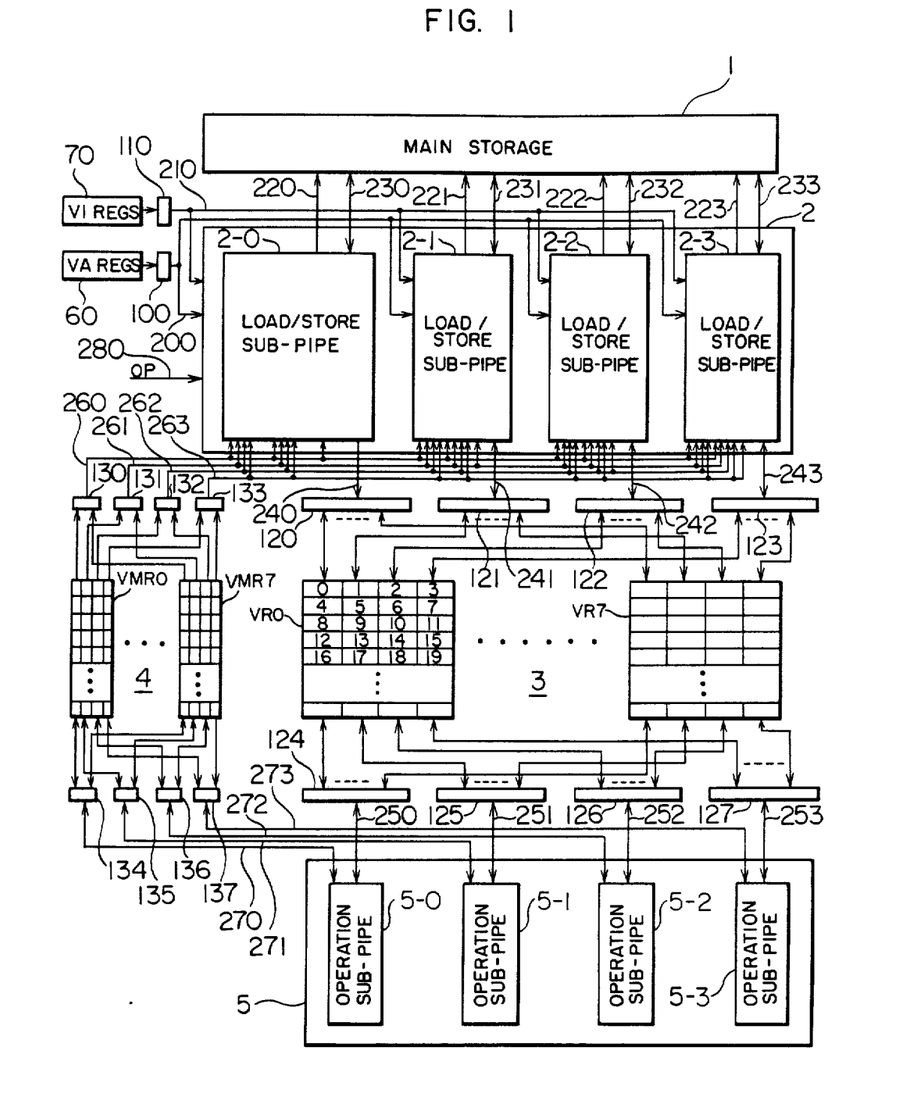
FIG. 1 shows a configuration of one embodiment of a vector processor of the present invention.

FIG. 1 shows a configuration of one embodiment of the vector processor of the present invention.

In FIG. 1, numeral 1 denotes a main storage, numeral 2 denotes a load/store pipe, and numeral 3 denotes a vector register group having eight vector registers VR0-VR7, of which onlly VR0 and VR7 are shown in FIG. 1. Each vector register is divided into storage location groups each having four continuous numbers $4n, 4n+1, 4n+2, 4n+3$ ($n=0, 1,...$). The elements in each group can be parallelly read or written. Numeral 4 denotes a vector mask register (VM register) group which comprises eight vector mask registers VMR0–VMR7, of which only two vector mask registers VMR0 and VMR7 are shown. Each vector mask register VRMi is divided into storage location groups each having four storage locations ($4n$–$4n+3$). The four mask bits in each group can be parallelly read and written. Numeral 5 denotes an operation pipe. The load/store pipe 2 processes the high speed data transfer between the main storage 1 and the vector register VRi or the vector mask register VMRi. The operation pipe 5 carries out an operation such as addition or multiplication at a high speed in a pipeline fashion, Vector data serially read from the vector register specified by an instruction is serially processed and the results are serially written into the vector register or vector mask register specified by the instruction. In the present embodiment, the numbers of the load/store pipes and the operation pipes are one, respectively, and the numbers of the vector registers and vector mask registers are eight, respectively, although those numbers are not essential.

The load/store pipe 2 is of parallel-by-element structure and comprise four load/store sub-pipes 2-O to 2-3. The four load/store sub-pipes 2-O to 2-3 are substantially of the same construction, and the data transfer between the main storage 1 and the vector register VRi or the vector mask register VMRi is carried out in the pipeline fashion at a rate of one element per machine cycle. Accordingly, the load/store pipe 2 as a whole has a capability to process in the pipeline fashion at a rate of four elements per machine cycle. In the present embodiment, the load/store sub-pipes 2-0 to 2-3 can read from the main storage the elements to be written into the 4n-th, (4n+1)th, (4n+2)th and (4n+3)th ($n=0, 1...$) storage locations of the vector register, or write into the main storage 1 the elements read from the storage locations.

Similarly, the operation pipe 5 is also of parallel-by-element structure and comprises four operation sub-pipes 5-O to 5-3. The four operation sub-pipes 5-0 to 5-3 are of the same construction, and process four vector elements parallelly read from the vector register at a rate of one operation per machine cycle and write the result into the vector register or vector mask register. Accordingly, the operation pipe 5, as a whole, can generate the results at a rate of four elements per machine cycle. In the present embodiment, the operation sub-pipes 5-0 to 5-3 process the vector elements read from the 4n-th, (4n+1)th, (4n+2)th and (4n+3)th (n=0, 1, 2, . . . ) storage locations of the vector register, respectively.

In the present embodiment, the load/store pipe 2 and the operation pipe 5 have four sub-pipes, respectively, although four sub-pipes are not essential the sub-pipes may be of any number such as 8 or 16.

Numeral 60 denotes a vector address register (VAR) group which comprises registers for holding main storage addresses (start addresses) of start elements of vector data in the main storage 1 or to be written into the main storage 1.

Numeral 70 denotes a vector increment (VI) register group which comprises registers for holding address increments of the elements of the vector data in or to be written into the main storage 1.

When the vector data in the main storage 1 is loaded into the vector register or the vector data in the vector register is stored into the main storage, the VA register and VI register which hold the start address and the element increment, respectively, and the vector register are designated by the instruction. For the instruction which loads or stores depending on the mask vector, such as a load expansion instruction or a store compression command, the mask vector register is also designated by the instruction. The contents of the VA register and VI register designated by the instruction are parallelly sent to four load/store sub-pipes 2-0 to 2-3, and are used to control the calculation of the address on the main storage 1 and the issuance of the access request to the main storage 1.

Numeral 100 denotes a selection circuit which selects the VA register designated by the load or store instruction, from the VA register group and supplies the content thereof to one of the load/store sub-pipes 2-0 to 2-3 through a data line 200.

Numeral 110 denotes a selection circuit which selects the VI register designated by the load or store instruction, from the VI register group and supplies the content thereof to one of the load/store sub-pipes 2-0 to 2-3 through a data line 210.

Numerals 120 to 123 denote switch matrix circuits which couple the load/store sub-pipes 2-0 to 2-3 to the vector register designated by the load or store instruction. Those switch matrix circuits 120 to 123 are connected to the load/store sub-pipes 2-0 to 2-3 through lines 240 to 243, respectively, and transfer the vector elements to be loaded to or read from the 4n-th, (4n+1)th, (4n+2)th and 4n+3)th (n=0, 1, 2, . . . ) storage locations of the vector register designated by the instruction. Numerals 124 to 127 also denote switch matrix circuits which couple the operation sub-pipes 5-0 to 5-3 to the vector register designated by the instruction. Those switch matrix circuits 124 to 127 are connected to the operation sub-pipes 5-0 to 5-3 through lines 250 to 253, and send the 4n-th, (4n+1)th, (4n+2)th and (4n+3)th (n=0, 1, 2, . . . ) elements of the vector data designated by the instruction to the operation sub-pipes 5-0 to 5-3, and send the results of the operation to other vector registers designated by the instruction.

Numerals 130 to 133 denote switch matrix circuits which couple the load/store sub-pipes 2-0 to 2-3 to the vector mask register designated by the load expansion instruction or store compression instruction. Those switch matrix circuits 130 to 133 are connected to the load/store sub-pipes 2-0 to 2-3 through lines 260 to 263 and parallelly transfer the 4n-th, (4n+1)th, (4n+2)th and (4n+3)th (n=0, 1, 2, . . . ) mask bits of the vector mask register to the load/store sub-pipes 2-0 to 2-3.

Numerals 134 to 137 also denote switch matrix circuits which couple the operation sub-pipes 5-0 to 5-3 to the vector mask register designated by the instruction which instructs the generation of the vector mask data. Those switch matrix circuits 134 to 137 are connected to the outputs of the operation sub-pipes 5-0 to 5-3 through lines 270 to 273 and transfer the 4n-th, (4n+1)th, (4n+2)th and (4n+3)th (n=0, 1, 2, . . . ) elements of the vector mask data resulting from the operation to the vector mask register designated by the instruction.

Numerals 220 to 223 denote signal lines through which reference addresses are sent from the load/store sub-pipes 2-0 to 2-3 to the main storage 1.

Numerals 230 to 233 denote signal lines which connect the load/store sub-pipes 2-0 to 2-3 and the main storage 1, and it is through these signal lines that the vector data to be loaded or stored and the reference request are transferred.

In FIG. 1, an instruction decode unit for decoding the instruction to be executed is not shown for purposes of simplification of the drawing. An operation code OP which indicates the type of instruction decoded by the instruction decode unit is supplied to the load/store pipe 2 through a line 280.

Before the construction and operation of the load/store sub-pipes 2-0 to 2-3 which are characteristic of the present invention are explained, the operation of the apparatus of FIG. 1 for the load expansion instruction is explained with reference to FIG. 4.

Figure 4:
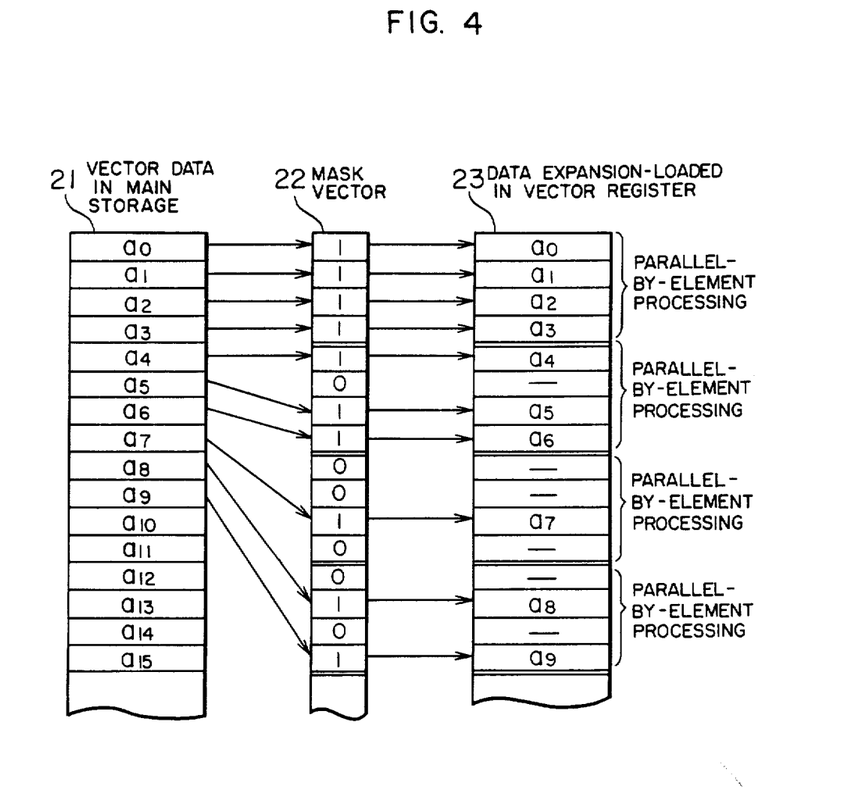
FIG. 4 shows processing of a load expansion instruction in the vector processor of FIG. 1.

In FIG. 4, numeral 21 denotes vector data to be loaded and designated by the load expansion instruction. Numeral 22 shows a mask vector in the mask vector register designated by the load expansion instruction. Numeral 23 denotes vector data loaded into the vector register designated by the instruction. In the apparatus shown in FIG. 1, a set of storage locations comprising four elements of each of the mask vector registers and the vector register are parallelly accessed. In FIG. 4, the mask register storage locations and the vector data storage locations which are to be parallelly accessed are shown by dual line blocks. In the first load operation by the load/store sub-pipes 2-0 to 2-3, the first set of mask bits are all "1" and the addresses of the vector elements $a_0$ to $a_3$ which are the first candidate for load are generated by the load/store sub-pipes 2-0 to 2-3 and those elements are parallelly loaded. In the second load operation, a set of vector elements which are the next candidates to the loaded elements are elements $a_4$ to $a_7$. Because the second mask bit of the next mask bit set "1011" is "0", it is necessary to prevent the loading of a vector element into the storage location in the vector register which corresponds to the second mask bit. In the present embodiment, the load/store sub-pipe 2-0 loads the element $a_4$, the load/store sub-pipe 2-1 does not load an element, and the load/store sub-pipes 2-2 and 2-3 load the elements $a_5$ and $a_6$, respectively. In the third load operation, a set of vector elements which are the next load candidates are $a_7$ to $a_{10}$. Since the next mask bit set is "0010", the load/store sub-pipe 2-2 stores the element $a_7$ in the storage position in the vector register which corresponds to the third mask bit, and other load/store sub-pipes do not load any elements. In the fourth load operation, a set of vector elements which are the next load candidates are $a_8$ to $a_{11}$. Since the next mask bit set is "0101", the load/store sub-pipes 2-1 and 2-3 load the elements $a_8$ and $a_9$ into the storage locations in the vector register which correspond to the second and fourth mask bits, and the other load/store sub-pipes do not load any elements.

By repeating the above steps, the elements of the vector data 21 in the main storage are sequentially stored in the storage locations of the vector register excluding the storage locations corresponding to "0" bits of the mask vector 22.

Figure 5:
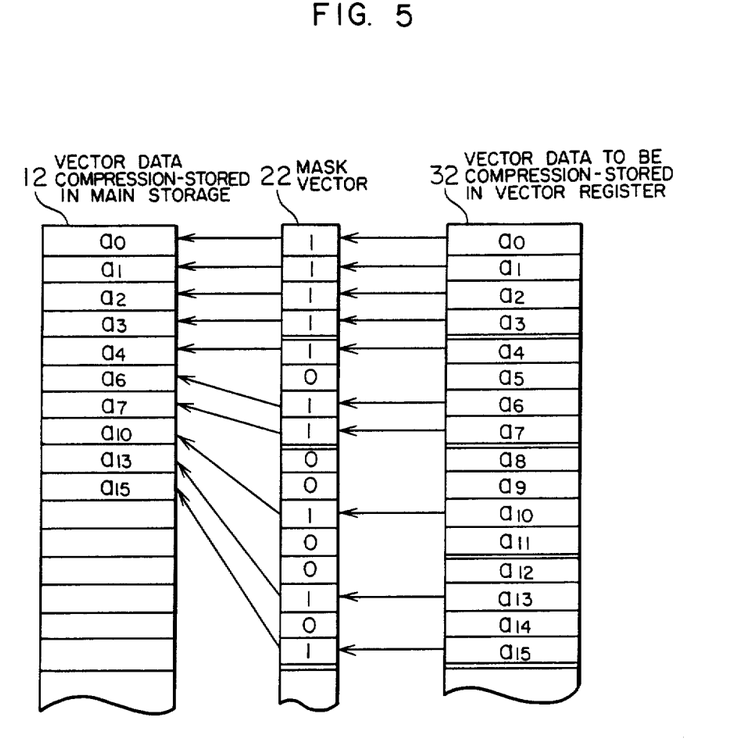
FIG. 5 shows processing of a store compression instruction in the vector processor of FIG. 1.

For the store compression instruction, as shown in FIG. 5, only those elements of the vector data 32 in the vector register whose corresponding mask vector elements of a mask vector 22 are "1" should be stored in the main storage in compressed form to produce the result data 12. The operation of the load/store sub-pipes 2-0 to 2-3 is similar to that of FIG. 4 except for the difference between the load and the store. In the first store operation, the mask bits which correspond to the elements $a_0$ to $a_3$ which are store candidates are all "1" and those elements are stored into the main storage 1 by the load/store sub/pipes 2-0 to 2-3. In the second store operation, the mask bit for the element $a_5$ of the next store candidates $a_4$ to $a_7$ is "0" and the element $a_5$ is not stored. The load/store sub-pipes 2-0 stores the element $a_4$ in the storage location of the main storage following to the element $a_3$, and the load/store sub-pipes 2-2 and 2-3 store the elements $a_6$ and $a_7$ in the storage locations following the element $a_4$. In the third store operation, only the mask bit for the element $a_{10}$ of the next store candidates $a_8$ to $a_{11}$ is "1", and so the load/store sub-pipe stores only the element $a_{10}$ in the storage location following the element $a_7$.

In the load expansion instruction or the store compression instruction, the main storage address which the load/store sub-pipe accesses depends on the total number of elements loaded or stored in the previous load or store operations and the total number of elements having preceding numbers in the set of elements which are load or store candidates in the current load or store operation.

The load/store sub-pipes of the present invention are constructed to generate the main storage addresses in accordance with the mask bits.

Figure 6:
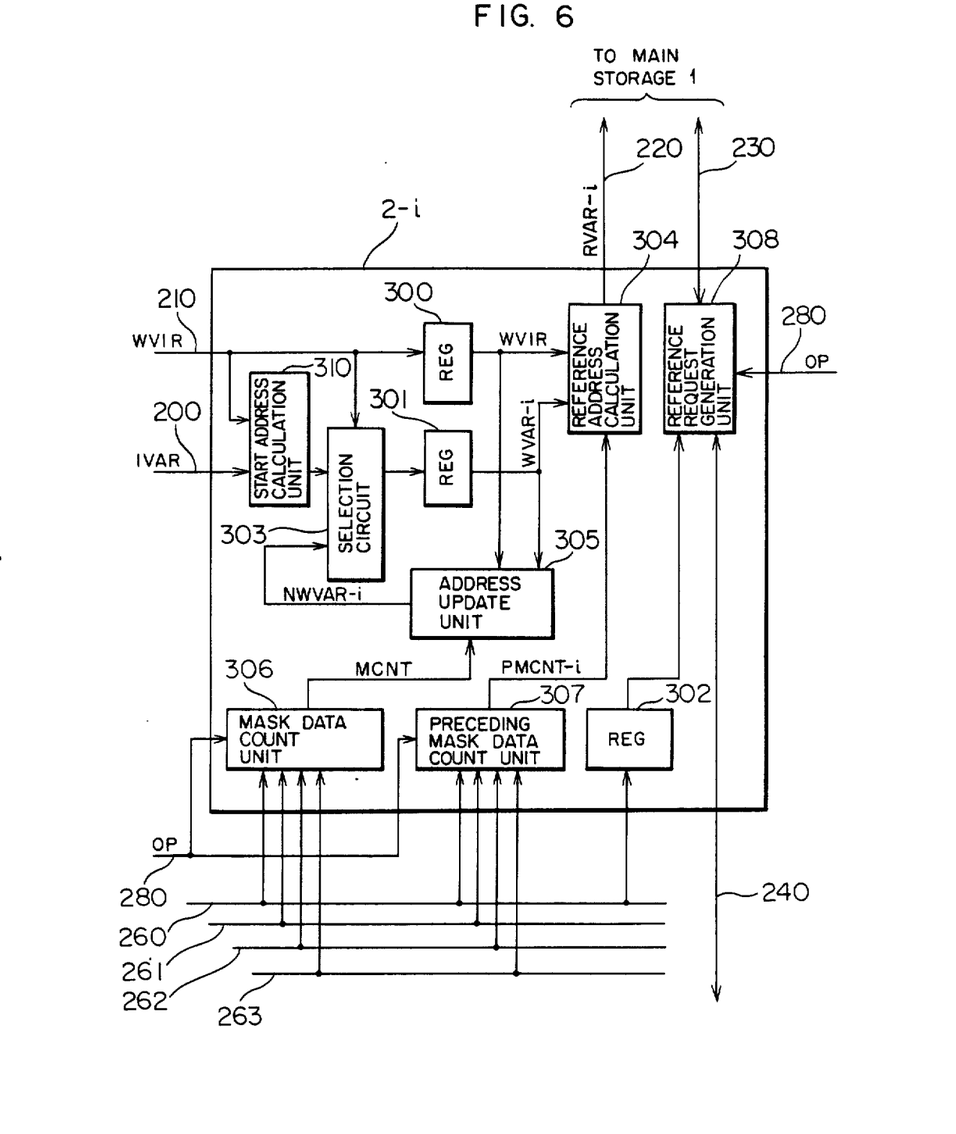
FIG. 6 shows a load/store sub-pipe in the vector processor of FIG. 1.

The construction and operation of the load/store sub-pipes 2-0 to 2-3 are explained. FIG. 6 shows a block diagram of the load/store sub-pipe 2-i (i=0, 1, 2 or 3). In FIG. 6, numerals 300, 301 and 302 denote registers, numeral 303 denotes a selection circuit, numeral 304 denotes a reference address calculation unit, numeral 305 denotes an address update unit, numeral 306 denotes a mask data count unit, numeral 307 denotes a preceding mask data count unit, numeral 308 denotes a reference request generation unit and numeral 310 denotes a start address calculation unit.

A content WVIR of the VI register designated by the instruction and sent through the data line 210 upon execution of the load instruction (including load expansion instruction) or store instruction (including store compression instruction) is set into the register 300 and it is held therein until the execution of the instruction is completed.

The start address calculation unit 310 calculates the main storage addresses (sub-pipe start addresses) of the vector elements 0 to 3 to be first processed by the load/store sub-pipe, based on the content IVAR of the VA register designated by the instruction and sent through the data line 200 and the content WVIR of the VI register on the data line 210, in accordance with the formula $$IVR+(WVIR \times i) \quad (i=0, 1, 2 \text{ or } 3) \tag{1}$$

The selection circuit 303 sets the calculated result into the register 301.

In the load/store sub-pipe 2-0, i=0 in the load/store sub-pipe 2-1, i=1, in the load/store sub-pipe 2-2, i=2, and in the load/store sub-pipe 2-3, i=3. In the load/store sub-pipe 2-0, the start address calculation unit 310 may produce the data IVAR on the line 200 as it is. The start address calculation unit 310 of the load/store sub-pipe 2-i (i=0, 1, 2 or 3) calculates the address in accordance with the formula (1). Thus, at the start of the execution of the instruction, the main storage addresses of the first set of vector elements of the vector data to be loaded or stored are held in the register 301 of the load/store sub-pipe 2-i. The register 301 of the load/store sub-pipe 2-i holds the main storage address WVAR-i corresponding to the i-th vector element of the set of vector elements to be next processed in parallel, as will be explained later. The formula (1) defines the initial value of WVAR-i.

The operation of the mask data count unit 306 is as follows. When the operation code on the line 280 is for the load expansion instruction or store compression instruction, the number of "1" mask bits of the set of mask bits (n-th, (n+1)th, (n+2)th and (n+3)th elements, (n=0, 1, 2, ...) sent through the signal lines 260 to 263 at the time of parallel-by-element processing is counted and produced as a mask count MCNT. The output count is one of 0, 1, 2, 3 or 4. Since the mask counts MCNT counted by the respective load/store sub-pipes are equal, one common mask data count unit 306 may be provided for the four load/store sub-pipes. When the instruction to be executed is the conventional load instruction other than the load expansion instruction or the conventional store instruction other than the store compression instruction, the mask count MCNT is always "4".

The operation of the preceding mask data count unit 307 is as follows. When the operation code OP on the line 280 is for the load expansion instruction or store compression instruction, the preceding mask data count unit 307 in the load/store sub-pipe 2-i (i=0, 1, 2 or 3) examines the mask bits preceding the mask bits supplied to the load/store sub-pipe, in the set of mask bits, that is, the mask bits 0 to (i-1) each time the set of mask bits are sent through the lines 260 to 263 at the time of the parallel-by-element processing, counts "0" mask bits and produces the result as the preceding mask count PMCNT-i. The preceding mask data count unit 307 in the load/store sub-pipe 2-0 always produces "0" as the preceding mask count PMCNT-0. Accordingly, the count unit 307 for the load/store sub-pipe 2-0 may be omitted. The preceding mask data count unit 307 of the load/store sub-pipe 2-1 examines the data line 260 through which the mask bit 0 is sent, and if it is "0", it produces "1" and if not, it produces "0" as the preceding mask count PMCNT-1. Similarly, the preceding mask data count unit 307 in the load/store sub-pipe 2-2 examines the data lines 260 and 261 through which the preceding mask bits 0 and 1 are sent, and counts "0" mask bits and produces the count (either 0, 1 or 2) as the preceding mask count PMCNT-2. The preceding mask data count unit 307 in the load/store sub-pipe 2-3 examines the data lines 260, 261 and 262 through which the preceding mask bits 0,1 and 2 are sent, counts "0" mask bits and produces the count (either 0, 1, 2 or 3) as the preceding mask count PMCNT-3. The preceding mask data count unit 307 always produces "0" as the preceding mask count PMCNT-i when the normal load instruction or store instruction is executed.

The reference address calculation unit 304 calculates the reference address on the main storage 1 when the reference request is issued to the main storage 1 and sends it to the main storage via line 220. The reference address RVAR-i is calculated based on the output of the register 301 (WVAR-i, an initial value of which is equal to the sub-pipe start address), the output of the register 300 (WVIR) and the output of the preceding mask data count unit 307 (PMCNT-i), in accordance with the formula $$RVAR\text{-}i = WVAR\text{-}i - (WVIR \times PMCNT\text{-}i) \qquad (2)$$

The result is sent to the main storage.

The address WVAR-i represents the main storage address for the i-th element of the set of vector elements to be processed parallel-by-element. The preceding mask count PMCNT-i represents the total number of elements whose corresponding mask bits are "0", of the elements 0, 1, ..., i-1 preceding to the i-th elements and belonging to the set of elements, that is, the number of elements which are not loaded or stored. Accordingly, when the i-th element is to be loaded or stored, it should be loaded or stored in the storage location represented by RVAR-i of the formula (2).

The register 302 of the i-th load/store sub-pipe 2-i is connected to one of the lines 260 to 263 to receive the i-th mask bit in the set of mask bits.

The reference request generation unit 308 issues the reference request for loading or storing to the main storage 1 through the line 230 and transfers the vector elements to be loaded or stored between the main storage 1 and the vector register through the lines 230 and 240. When the operation code OP which specifies the load expansion or store compression is supplied to the line 280, the reference request to the main storage 1 is issued only when the mask bit in the register 302 is "1".

The address update unit 305 in the load/store sub-pipe 2-i generates the main storage address NWVAR-i for the i-th elements in the set of vector elements to be next processed parallel-by-element, each time the parallel-by-element processing cycle is terminated. Namely, based on the output WVAR-i of the register 301, the increment WVIR of the register 300 and the mask count MCNT of the mask data count unit 306, it calculates the address as follows.

$$NWVAR\text{-}i = WVAR\text{-}i + (WVIR \times MCNT) \qquad (3)$$

The address is set in the register 301 as a new WVAR through the selection circuit 303.

The mask count MCNT represents the number of "1" mask bits of the set of mask bits for the set of vector elements which are candidates for the current parallel-by-element processing, as described above. Accordingly, it represents the number of loaded elements in the current parallel-by-element processing. The vector element which may be a candidate of the next parallel-by-element processing is an element which is behind by MCNT, and the address of the element can be calculated by the formula (3).

In the manner, the register 301 in the i-th load/store sub-pipe 2-i holds the main storage address for the i-th element in the set of vector elements in the next parallel-by-element processing.

The manner in which the load expansion instruction is executed in the load/store pipe of the embodiment of the present invention is explained with reference to FIG. 7.

Figure 7:
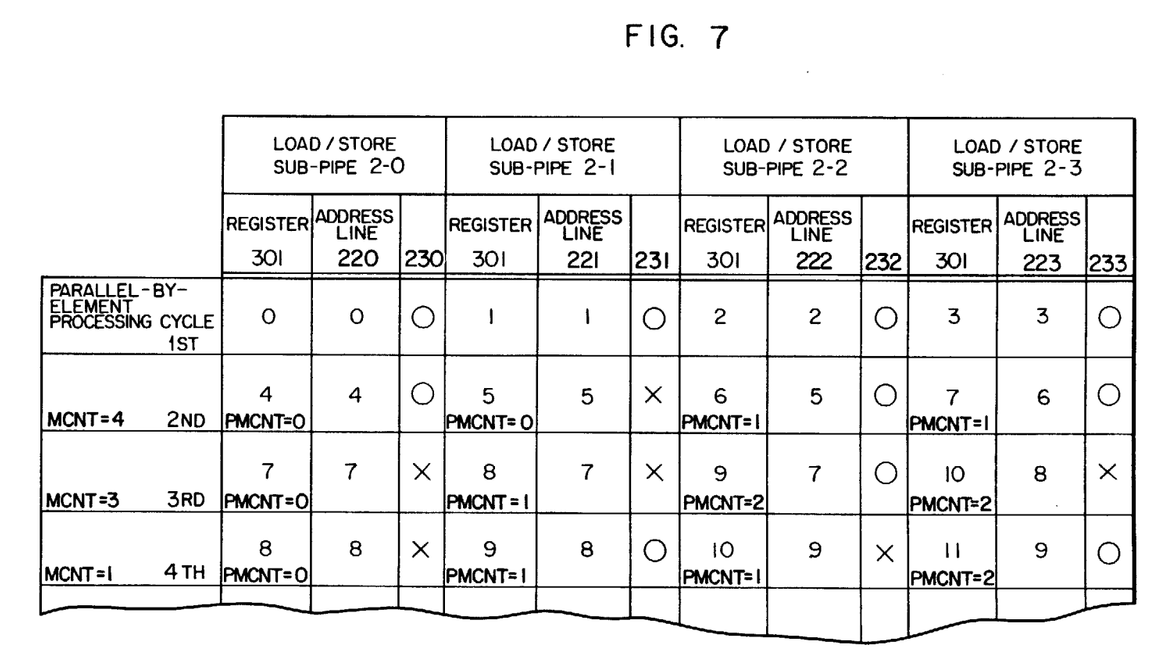
FIG. 7 shows an operation of the load/store sub-pipe of in FIG. 6 in processing the load expansion instruction or store compression instruction.

In a table shown in FIG. 7, a horizontal row shows the operations of the load/store sub-pipes 2-0 to 2-3 of FIG. 1, and includes the following items for each load/store sub-pipe: the output WVAR-i of the register 301, the main storage address RVAR-i to be referenced and sent through the address lines 220 to 223, and whether the reference request has been issued through the data lines 230 to 233. The output WVAR-i of the register 301 and the main storage address RVAR-i to be referenced are indicated by the order number of the vector element instead of the actual address in order to simplify the explanation. Where the reference request has been issued, it is indicated by o, and where the reference request has not been issued, it is indicated by X. On the other hand, a vertical column of the table of FIG. 7 shows the order of the parallel-by-element processing. In the embodiment of the vector processor of the present invention shown in FIG. 1, four elements are processed in parallel in one parallel-by-element processing cycle for one column.

As seen from FIG. 4, it is necessary to issue the reference requests corresponding to the elements $a_0$ to $a_3$ from the load/store sub-pipes 2-0, 2-1, 2-2 and 2-3 of FIG. 1, respectively, in the first parallel-by-element processing cycle, the reference requests corresponding to the elements $a_4$ to $a_6$ from the load/store sub-pipes 2-0, 2-2 and 2-3, respectively, in the second parallel-by-element processing, the reference request corresponding to the element $a_7$ from the load/store sub-pipe 2-2 in the third parallel-by-element processing, and the reference requests corresponding to the elements $a_8$ and $a_9$ from the load/store sub-pipes 2-1 and 2-3, respectively, in the fourth parallel-by-element processing cycle.

In the first parallel-by-element processing cycle, the addresses of the elements $a_0$ to $a_3$ to be first processed are set in the registers 301 of the load/store sub-pipes 2-0 to 2-3. The mask bits corresponding to the first parallel-by-element processing are all "1", the load/store sub-pipes 2-0 to 2-3 all issue the reference requests, the preceding mask counts PMCNT-0 to PMCNT-3 generated by the preceding mask data count units 307 of the load/store sub-pipes are "0", the addresses RVAR-0 to RVAR-3 generated by the reference address calculation units 304 of the load/store sub-pipes 2-0 to 2-3 in accordance with the formula (2) are for the elements $a_0$ to $a_3$, respectively, and they are sent to the main storage 1 through the address lines 220 to 223. The mask data count units 306 in the load/store sub-pipes produce 4 which is the number of "1" mask bits as the mask count MCNT, and the registers 301 of the load/store sub-pipes 2-0 to 2-3 are updated to the addresses of the elements $a_4$ to $a_7$, respectively, by the address update unit 305 in accordance with the formula (3). In the second parallel-by-element processing, the outputs PMCNT-0 to PMCNT-3 of the preceding mask data count units 307 of the load/store sub-pipes 2-0 to 2-3 are "0", "0", "1" and "1", respectively, and the main storage addresses RVAR-0 to RVAR-3 generated by the reference address calculation unit 304 are the addresses of the elements $a_4$ to $a_6$, respectively. On the other hand, the three load/store sub-pipes 2-0, 2-2 and 2-3 issue the reference requests. Thus, the elements $a_4$ to $a_6$ are exactly referenced. The mask data count units 306 of the load/store sub-pipes produce "3" as MCNT, and the registers 301 of the load/store sub-pipes 2-0 to 2-3 are updated to the addresses of the elements $a_7$ to $a_{10}$, respectiviely. In the third parallel-by-element processing cycle, the outputs PMCNT-0 to PMCNT-3 of the preceding mask data count units 307 of the load/store sub-pipes 2-0 to 2-3 are "0", "1", "2", respectively, and the main storage addresses RVAR-0 to RVAR-3 generated by the reference address calculation units 304 are for the elements $a_7$, $a_7$, $a_7$ and $a_8$, respectiely. Only the load/store sub-pipe 2-2 issues a reference request and the second element $a_7$ is exactly referenced. The mask data count units 306 of the load/store sub-pipes produce "1" as MCNT, and the addresses of the elements $a_8$ to $a_{11}$ are set in the registers 301 of the load/store sub-pipes 2-0 to 2-3.

Similar processing is carried out in the fourth parallel-by-element processing, and the elements $a_8$ and $a_9$ are exactly referenced as shown in FIG. 7.

As described above, the load expansion instruction and store compression instruction are efficiently executed parallel-by-element at a high speed by the vector processor shown in FIG. 1.

In the apparatus of FIG. 1, the conventional store instruction other than the store compression instruction (the instruction which does not use the mask vector register) and the conventional load instruction other than the load expansion instruction (the instruction which does not use the mask vector register) can be executed in the following manner.

In the load/store sub-pipes, the following operations are carried out.

(1) The mask data count unit 306 always produces "4" as MCNT.

(2) The preceding mask data count unit 307 always produces "0" as PMCNT-i.

Figure 8:
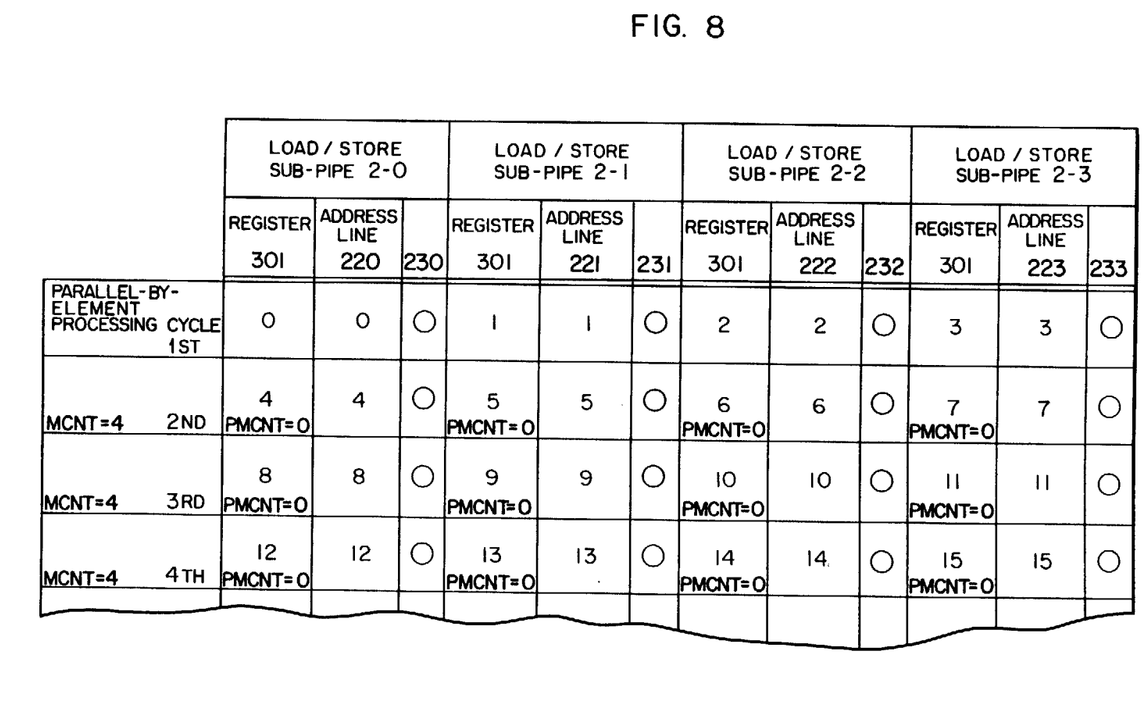
FIG. 8 shows an operation of the load/store sub-pipe of FIG. 6 in processing conventional load instruction or store instruction.

Accordingly, as shown in FIG. 8, the reference request for four elements is issued in one parallel-by-element processing cycle, and the addresses of the registers 301 of the load/store sub-pipes are uniformly updated by four elements. In the second and subsequent parallel-by-element processing cycles, similar processing is carried out.

Figure 9:
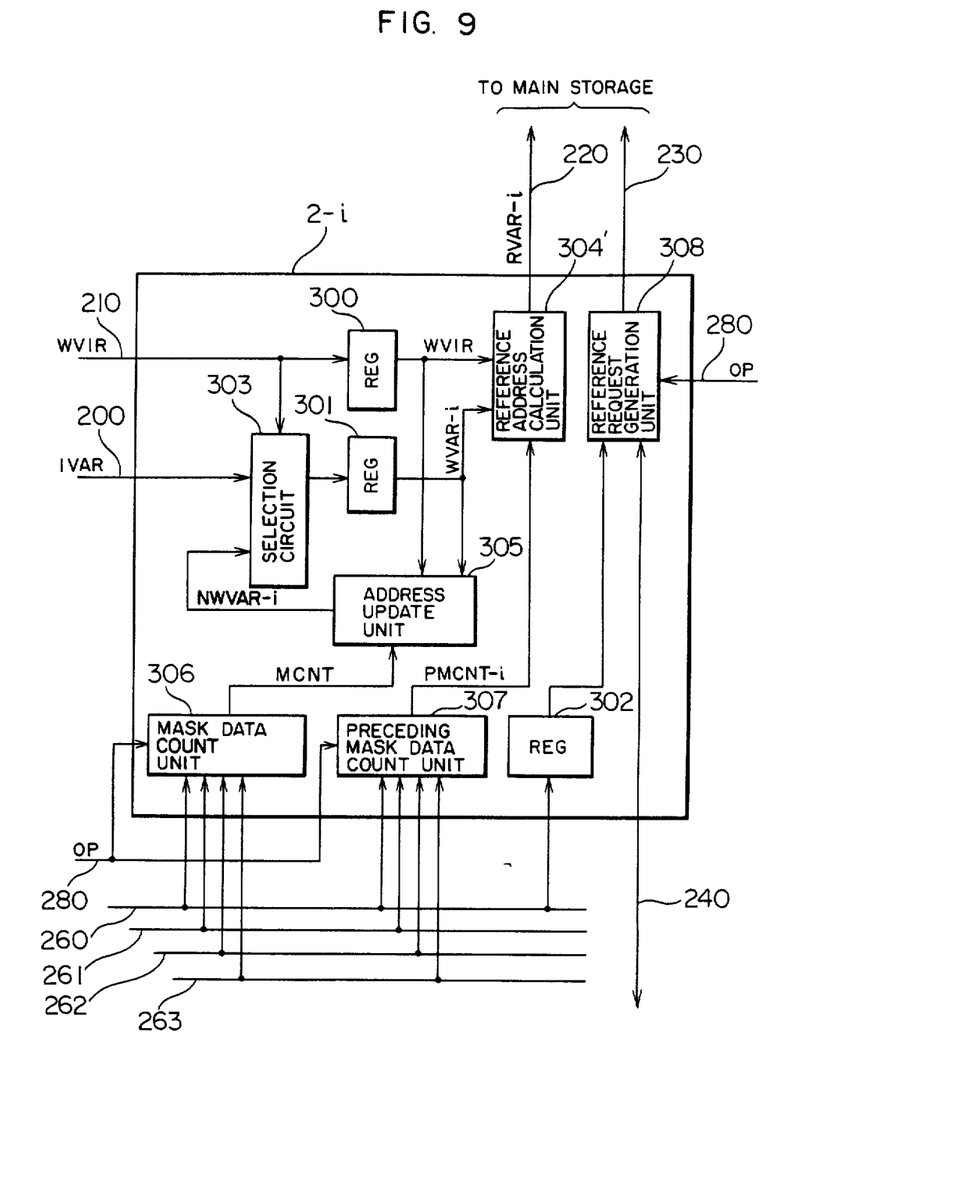
FIG. 9 shows a modification of the vector processor of the present invention.

A modification of the embodiment of FIG. 1 is shown in FIG. 9. In FIG. 9 like numerals to those shown in FIG. 6 designate like elements. The start address calculation unit 310 of FIG. 6 has been omitted at the start of the execution of the instruction, the content IVAR of the VA register sent through the data line 200 is selected and set in the register 301. Then, the selection circuit 303 selects the output of the address update unit 305, as is done in FIG. 6. The address update unit 305 may be of the same construction as that shown in FIG. 6. The output WVAR-i of the address update unit 305 is constant irrespective of the load/store sub-pipe number. The output indicates the main storage address of the next vector element to the vector element processed in the previous load or store processing. In the load expansion or store compression processing, the preceding mask data count unit 307' produces as PMCNT-i the number of "1" mask bits of the set of mask bits 0 to (i-1) when the store/load sub-pipe number to which it belongs is i. In FIG. 6, the number of "0" mask bits is produced as PMCNT-i.

The preceding mask data count unit 307' produces a fixed value when the conventional load or store instruction is executed. The fixed value is predetermined for each load/store sub-pipe. That is, "0" for the load/store sub-pipe 20, "1" for the load/store sub-pipe 21, "2" for the load/store sub-pipe 22, and "3" for the load/store sub-pipe 23.

Based on the output WVAR-i of the register 301, the output WVIR of the register 300 and the output PMCNT-i of the preceding mask data count unit 307', the reference address calculation unit 304' calculates the main storage address RVAR-i in accordance with the following formula $$RVAR\text{-}i = WVAR\text{-}i + (WVIR \times PMCNT\text{-}i) \qquad (2')$$

Figure 10:
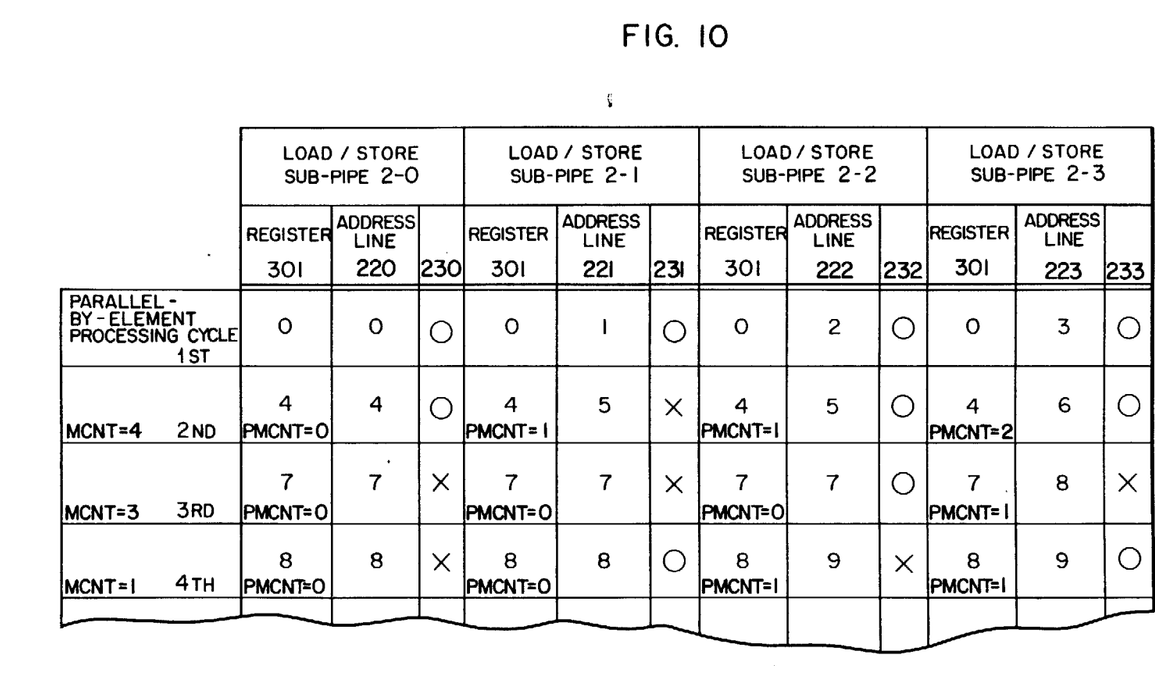
FIG. 10 shows an operation in processing the load expansion instruction or store compression instruction in the vector processor of FIG. 9.
Figure 11:
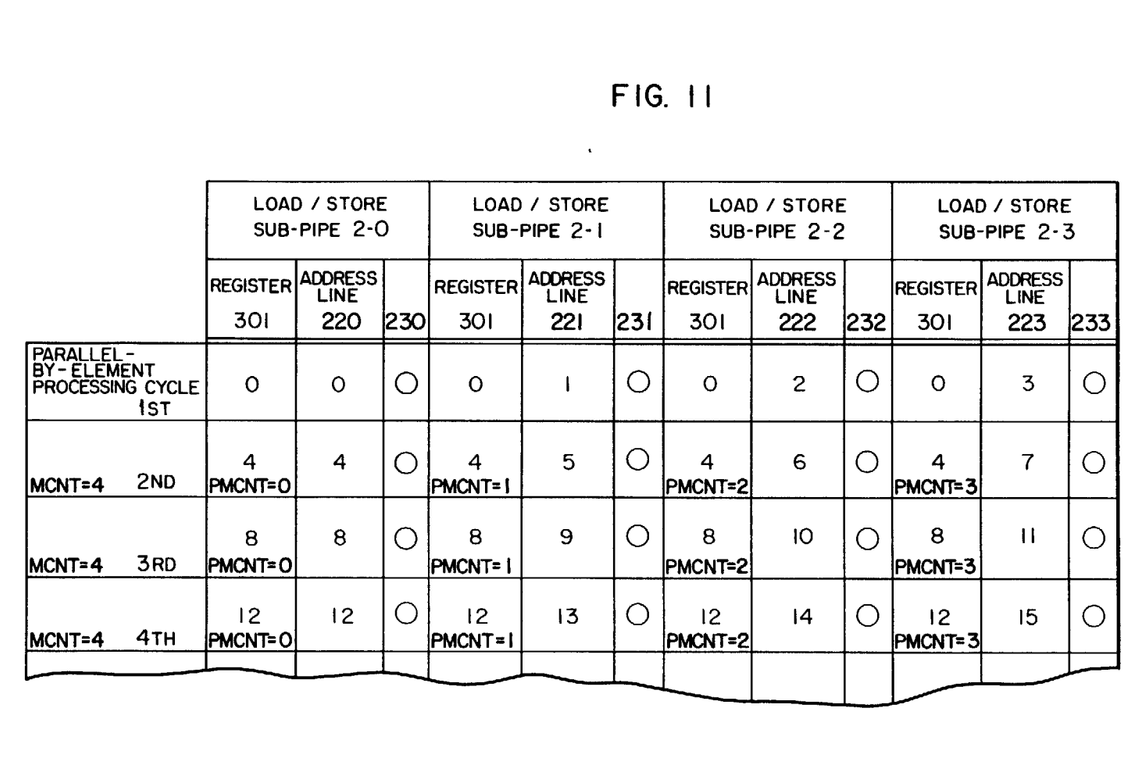
FIG. 11 shows an operation in processing the conventional load instruction or store instruction in the vector processor of FIG. 9.

The operation to execute the load expansion instruction or store compression instruction and the operation to execute the conventional load instruction or store instruction in the present modification are shown in FIGS. 10 and 11.

In FIGS. 10 and 11, WVAR-i represents the address of the first vector element of the four vector elements which are candidates of the current load or store processing, and it is constant irrespective of the value i. PMCNT-i represents the number of "1" preceding mask bits of the set of mask bits read for the current load or store processing, and the main storage address is determined by the sum of PMCNT-i and WVAR-i. On the other hand, in FIGS. 7 and 8, WVAR-i represents the address of the i-th element of the four vector elements which are candidates of the current load or store processing, PMCNT-i represents the number of "0" preceding mask bits of the set of mask bits, and the main storage address is determined by the sum of WVAR-i and PMCNT-i×WVIR.

In FIG. 11, like in FIG. 7, the elements 0 to 3 are exactly referenced from the load/store sub-pipe, in the first parallel-by-element cycle, the elements 4 to 6 are exactly referenced in the second parallel-by-element cycle, the element 7 is exactly referenced in the third parallel-by-element processing cycle, and the elements 8 and 9 are exactly referenced in the fourth parallel-by-element processing cycle.

As described above, in accordance with the present invention, the load expansion instruction and store compression instruction are executed parallel-by-element at a high speed in the vector processor of the parallel-by-element pipelined configuration.

We claim:

1. A vector processor, comprising:
    (a) a memory for holding data;
    (b) at least one vector register including means for holding a set of vector elements and means for reading out said vector elements sequentially in groups in response to a store compression instruction, wherein each group comprises m (m>1) vector elements which are read out in parallel;
    (c) at least one vector mask register including means for holding a set of mask bits each corresponding to one vector element of the set of vector elements, each mask bit comprising a valid mask bit or an invalid mask bit, and means for reading out the set of mask bits sequentially in groups in response to said store compression instruction, wherein each group comprises m mask bits corresponding to a respective group of m vector elements, wherein a respective group of m mask bits are read out in parallel and in synchronism with read out of a corresponding group of vector elements;

(d) store means connected to said memory, said vector register and said vector mask register and responsive to said store compression instruction for selectively writing vector elements, within a set of vector elements currently read out of said vector register and corresponding to valid mask bits within the corresponding set of mask bits, into regularly spaced storage locations of said memory;

(d1) wherein said store means comprises first to m-th parallelly operable access means, wherein an i-th ($1 \leq i \leq m$) access means includes means for writing into said memory an i-th vector element of a respective group of vector elements currently read out from said vector register, in response to an i-th mask bit of a group of corresponding mask bits currently read out from the mask register when said i-th mask bit is a valid mask bit;

(d2) wherein said first access means includes means for generating an address of a storage location of said memory into which a first vector element of the read out group of vector elements is to be written when a first mask bit of the read out mask bits is a valid mask bit included in all groups of m mask bits read out before the currently read out group of m mask bits;

(d3) wherein each j-th ($2 \leq j \leq m$) access means includes means for generating an address of a storage location of said memory into which a j-th vector element of the currently read out group of vector elements is to be written when a j-th mask bit of the currently read out group of m mask bits is a valid mask bit, depending upon said total number of valid mask bits in all previously read out groups of mask bits and upon a total number of valid or invalid mask bits included in the first to (j−1)th mask bits included in the currently read out m mask bits.

2. A vector processor according to claim 1, wherein the memory is a main storage of the vector processor.

3. A vector processor according to claim 1, wherein said address generating means included in each of said first to m-th access means includes means for generating an address depending upon an address increment between two adjacent storage locations of the regularly spaced storage locations of said memory.

4. A vector processor, comprising:

(a) a memory for holding a set of vector elements;

(b) at least one vector mask register including means for holding a set of mask bits and means for sequentially reading out said mask bits in first groups in response to a load expansion instruction, wherein each first group comprises m (m>1) mask bits which are read out in parallel, wherein each mask bit comprises either a valid mask bit or an invalid mask bit;

(c) at least one vector register comprised of a set of storage locations divided into a plurality of second groups each having m storage locations, wherein each respective second group comprises storage locations corresponding to the respective m mask bits belonging to one of the first groups, wherein the different second groups of m storage locations are accessible sequentially for write-in of vector elements and respective storage locations of each second group are accessible in parallel for write-in of vector elements;

(d) load means connected to said memory, said vector register and said vector mask register and responsive to said load expansion instruction for transferring vector elements corresponding to valid mask bits from said memory to storage locations within said vector register;

(d1) wherein said load means includes first to m-th parallelly operable access means, wherein an i-th ($1 \leq i \leq m$) access means includes means, responsive to an i-th mask bit of a group of m mask bits currently read out from the vector mask register when said i-th mask bit is a valid mask bit, for reading from said memory one of the set of vector elements to be written into an i-th storage location of a group of m storage locations corresponding to the currently read out group of m mask bits;

(d2) wherein said first access means includes means for generating an address of a storage location of said memory from which a vector element to be written into a first storage location of the corresponding group of m storage locations is to be read when a first mask bit of the currently read out group of mask bits is a valid mask bit, said address being determined depending upon a total number of valid mask bits included in all groups of mask bits read out before the currently read out group of m mask bits;

(d3) wherein each j-th ($2 \leq j \leq m$) access means includes means for generating an address of a storage location of said memory from which a vector element to be written into a j-th storage location of the corresponding group of m storage locations is to be read when a j-th mask bit of the read out group of m mask bits is a valid mask bit, said address being determined depending upon said total number of said valid mask bits in all previous groups of read out mask bits and upon a total number of valid or invalid mask bits included in the first to (j−1)-th mask bits of the currently read out group of m mask bits.

5. A vector processor according to claim 4, wherein said memory is a main storage of said vector processor.

6. A vector processor according to claim 4, wherein said address generating means included in each of said first to m-th access means includes means for generating an address depending upon an address increment between two of the set of vector elements held by said memory.

* * * * *

UNITED STATES PATENT AND TRADEMARK OFFICE
CERTIFICATE OF CORRECTION

PATENT NO.  : 4,881,168
DATED       : November 14, 1989
INVENTOR(S) : Inagami, et al.

It is certified that error appears in the above-identified patent and that said Letters Patent is hereby corrected as shown below:

Claim 1, column 13, line 28, after "valid mask bit" insert

--, depending upon a total number of valid mask bits--.

Signed and Sealed this

Fourteenth Day of December, 1993

Attest:

BRUCE LEHMAN

*Attesting Officer*     Commissioner of Patents and Trademarks